United States Patent
Jeson et al.

(10) Patent No.: US 8,588,530 B2
(45) Date of Patent: Nov. 19, 2013

(54) METHOD AND CAMERA FOR DETECTING A REGION HAVING A SPECIFIC SHAPE

(75) Inventors: Seoung-seon Jeson, Changwon (KR); Dae-Jin Kim, Pohang-si (KR); Bong-jin Jun, Pohang-si (KR); Jong-min Yun, Pohang-si (KR)

(73) Assignees: Samsung Techwin Co., Ltd., Changwon (KR); Postech Academy-Industry Foundation, Pohang-si (KR)

( * ) Notice: Subject to any disclaimer, the term of this patent is extended or adjusted under 35 U.S.C. 154(b) by 185 days.

(21) Appl. No.: 13/183,726

(22) Filed: Jul. 15, 2011

(65) Prior Publication Data

US 2012/0014607 A1   Jan. 19, 2012

(30) Foreign Application Priority Data

Jul. 15, 2010 (KR) .................. 10-2010-0068588
Jun. 20, 2011 (KR) .................. 10-2011-0059649

(51) Int. Cl.
*G06K 9/46* (2006.01)
(52) U.S. Cl.
USPC ........... 382/190; 382/195; 382/118; 382/254; 382/165
(58) Field of Classification Search
USPC .................. 382/190, 195, 118, 165, 254
See application file for complete search history.

(56) References Cited

U.S. PATENT DOCUMENTS

| | | | |
|---|---|---|---|
| 8,429,168 B1* | 4/2013 | Chechik et al. | 707/741 |
| 2006/0029291 A1* | 2/2006 | Sun et al. | 382/294 |
| 2007/0291999 A1* | 12/2007 | Ito et al. | 382/118 |
| 2008/0166026 A1* | 7/2008 | Huang et al. | 382/118 |
| 2009/0052798 A1* | 2/2009 | Kwon et al. | 382/264 |
| 2010/0014122 A1* | 1/2010 | Massicot et al. | 358/3.28 |
| 2010/0135574 A1* | 6/2010 | Buscema | 382/156 |
| 2011/0268319 A1* | 11/2011 | Niskanen et al. | 382/103 |
| 2012/0183177 A1* | 7/2012 | Ku et al. | 382/103 |

FOREIGN PATENT DOCUMENTS

| | | |
|---|---|---|
| JP | 3638028 B2 | 1/2005 |
| JP | 2009-123081 A | 6/2009 |
| KR | 10-0484141 B1 | 4/2005 |
| KR | 10-0559471 B1 | 3/2006 |
| KR | 10-0866792 B1 | 10/2008 |

OTHER PUBLICATIONS

Baochang Zhang; Yongsheng Gao; Sanqiang Zhao; Jianzhuang Liu, "Local Derivative Pattern Versus Local Binary Pattern: Face Recognition With High-Order Local Pattern Descriptor," Image Processing, IEEE Transactions on , vol. 19, No. 2, pp. 533,544, Feb. 2010.*
Xiaoyang Tan and Bill Triggs, "Enhanced Local Texture Feature Sets for Face Recognition Under Difficult Lighting Conditions", Springer-Verlag Berlin Heidelberg 2007.*

* cited by examiner

*Primary Examiner* — Stephen R Koziol
*Assistant Examiner* — Shaghayegh Azima
(74) *Attorney, Agent, or Firm* — Sughrue Mion, PLLC

(57) ABSTRACT

A method of detecting a region having a specific shape in a camera is provided. The method includes processing input image data in a camera and detecting the region having the specific shape. The method includes calculating gradation differences between a central pixel and respective peripheral pixels in each of local regions of an image frame, comparing an average gradation difference with each of the gradation differences and obtaining local gradient pattern (LGP) values based on a comparison result in each of the local regions, and detecting the region having the specific shape from the image frame using the LGP values obtained from the respective local regions.

11 Claims, 8 Drawing Sheets

METHOD AND CAMERA FOR DETECTING A REGION HAVING A SPECIFIC SHAPE

CROSS-REFERENCE TO RELATED PATENT APPLICATIONS

This application claims the benefit of Korean Patent Application No. 10-2010-0068588 filed on Jul. 15, 2010, and Korean Patent Application No. 10-2011-0059649 filed on Jun. 20, 2011, in the Korean Intellectual Property Office, the disclosures of which are incorporated herein in their entireties by reference.

BACKGROUND

1. Field

Methods and apparatus consistent with exemplary embodiments relate to a method and a camera for detecting a region having a specific shape, and more particularly, to a method and a camera for detecting a region having a specific shape by which input image data is processed in the camera to detect the region having the specific shape.

2. Description of the Related Art

A camera, for example, a surveillance camera or a digital camera, may function to process input image data and detect a region having a specific shape, for example, a region of the human's face or a region of a license plate of a vehicle. The above-described function of the camera may be employed in many fields.

For example, a digital camera may correct a skin tone of the detected region of the human's face or remove defects from the detected region of the human's face. Also, only when the face turns towards a front surface of the camera by measuring an angle of the detected region of the human's face, the camera may capture an image or perform an auto-focus (AF) operation.

A surveillance camera may detect a face region and perform a surveillance function or pursue a motion track only when a human appears on the camera. Thus, unnecessary calculation amounts and storage spaces may be reduced.

When the surveillance camera watches an automated teller machine (ATM), the surveillance camera may determine a human's face during withdrawal of cash, the surveillance camera may prevent the withdrawal of cash when the human's face is disguised, and enable the withdrawal of the cash when the human's face is normally exposed.

Meanwhile, in another example, a surveillance camera may precisely detect a region of a license plate of a vehicle and aid in the capture of vehicles that violate traffic regulations.

FIG. 1 is a diagram illustrating a method of forming a local binary pattern (LBP) used for detecting a region having a specific shape in a typical camera. In FIG. 1, reference numeral 11 denotes a local region, 12 denotes a binary value of an LBP, and 13 denotes a denary value of an LBP.

Referring to FIG. 1, each of local regions 11 of an input image frame may include 9 pixels arranged in form of a 3×3 matrix. A method of obtaining a value of an LBP in each of the local regions 11 will now be described in detail.

Since a gradation 70 of a left-upper pixel is greater than a gradation 60 of a central pixel, binary data of a first bit (bit number 0, least significant bit (LSB)) may be "1".

Since a gradation 20 of a middle-upper pixel is less than the gradation 60 of the central pixel, binary data of a second bit (bit number 1) may be "0". Similarly, since the gradation 20 of a right-upper pixel is less than the gradation 60 of the central pixel, binary data of a third bit (bit number 2) may be "0".

Since a gradation 120 of a right-middle pixel is greater than the central pixel, binary data of the fourth bit (bit number 3) may be "1". Similarly, when the gradation 120 of a right-lower pixel is greater than the gradation 60 of the central pixel, binary data of a fifth bit (bit number 4) may be "1".

Since the gradation 20 of a middle-lower pixel is less than the gradation 60 of the central pixel, binary data of a sixth bit (bit number 5) may be "0". Since the gradation 20 of a left-lower pixel is less than the gradation 60 of the central pixel, binary data of a seventh bit (bit number 6) may be "0". Similarly, since a gradation 50 of a left-middle pixel is less than the gradation 60 of the central pixel, binary data of an eighth bit (bit number 7) may be "0".

The above-described method of forming the LBP may be expressed as in Equation 1:

$$LBP(x_c, y_c) = \overset{7}{\underset{n=0}{Q}} s(i_n, i_c) 2^n, \quad (1)$$

wherein $x_c$, $y_c$ denotes central coordinates of each of the local regions 11, $i_c$ denotes the gradation 60 of the central pixel, and $i_n$ denotes each of the gradations of pixels disposed adjacent to the central pixel. Function of $s(i_n-i_c)$ is "1" when $(i_n-i_c)$ is zero (0) or more, and is "0" when $(i_n-i_c)$ is less than 0.

When a camera detects a region having a specific shape using an LBP as described above, since a gradation pattern is not directly used, the camera may be robust against a variation of illumination.

However, when a gradation difference between adjacent pixels is exceptionally great in an interfacial region having a specific shape, LBP values may be also exceptionally increased. Thus, detecting a region having a specific shape may be difficult under the circumstances of limited learning result data.

For example, when a human as a subject for photography wears very dark glasses at a high luminous intensity or wears very bright makeup at a low luminous intensity, detecting a face region may be difficult.

Similarly, when a license plate of a vehicle is against a very dark background in very bright light or is against a very bright background in very dark light, detecting a region of the license plate of the vehicle may be difficult.

SUMMARY

One or more exemplary embodiments provide a method of detecting a region having a specific shape, which may work in a variety of illumination settings and detect a region having a specific shape even if a gradation difference between adjacent pixels is exceptionally great in an interface region having a specific shape.

According to an aspect of an exemplary embodiment, there is provided a method of detecting a region having a specific shape including processing input image data in a camera and detecting a region having a specific shape. The method includes (a) calculating gradation differences between a central pixel and respective peripheral pixels in each of local regions of an image frame, (b) comparing an average gradation difference with each of the gradation differences and obtaining values of a local gradient pattern (LGP) based on a comparison result in each of the local regions, and (c) detecting the region having the specific shape from the image frame using the LGP values obtained from the respective local regions.

BRIEF DESCRIPTION OF THE DRAWINGS

The above and/or other features and advantages of the present disclosure will become more apparent by describing in detail certain exemplary embodiments thereof with reference to the attached drawings in which.

DETAILED DESCRIPTION

Certain exemplary embodiments will be described more fully hereinafter with reference to the accompanying drawings.

Figure 2:
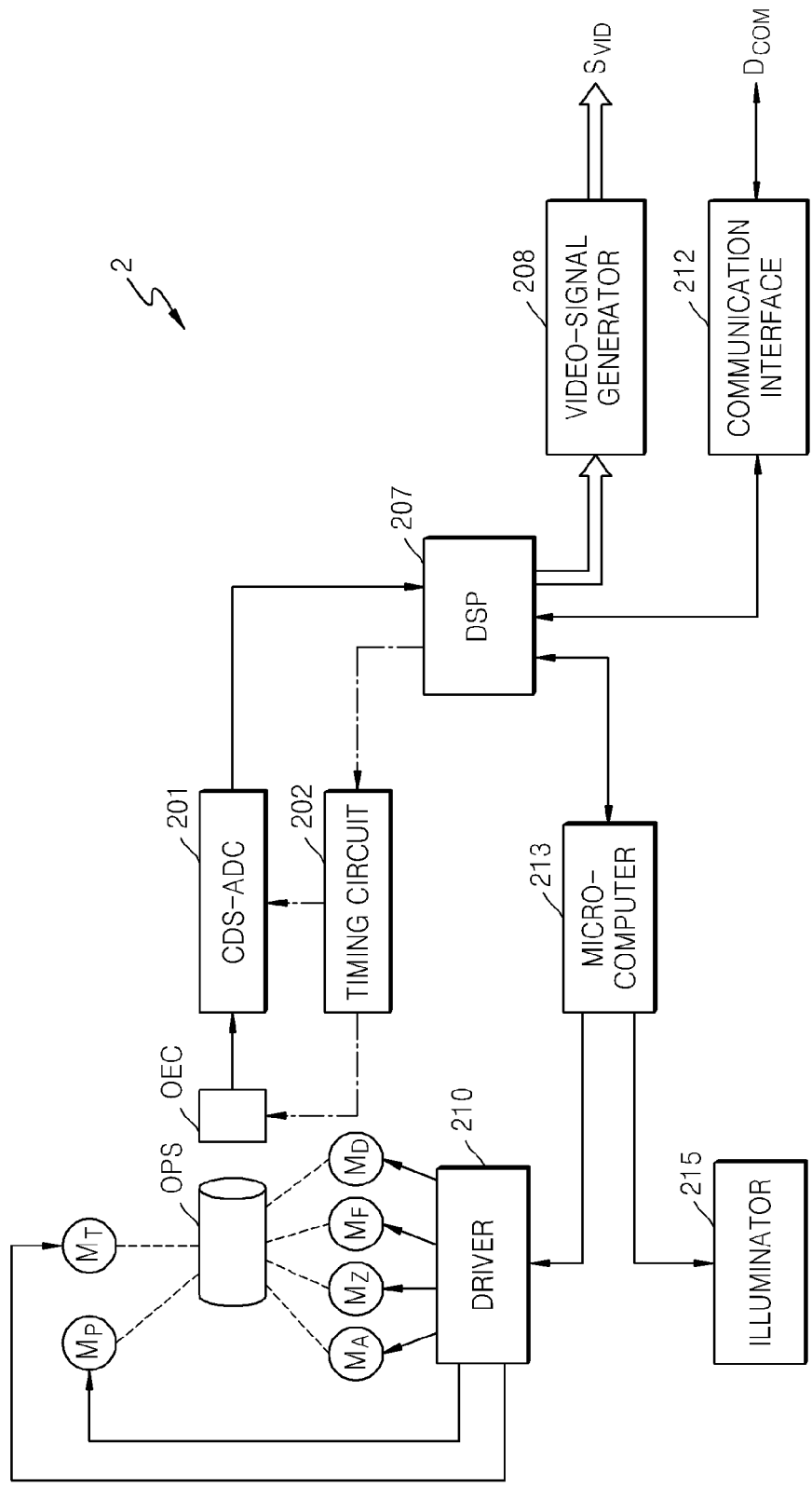
FIG. 2 is a block diagram of an internal construction of a surveillance camera using a method of detecting a shape according to an exemplary embodiment.

FIG. 2 is a block diagram of an internal construction of a surveillance camera 2 using a method of detecting a region having a specific shape according to an exemplary embodiment.

Referring to FIG. 2, the surveillance camera 2 may include an optical system OPS, an optoelectric converter OEC, a correlation double sampler and analog-to-digital converter (CDS-ADC) 201, a timing circuit 202, a digital signal processor (DSP) 207 functioning as a controller, a video-signal generator 208, an iris motor MA, a zoom motor MZ, a focus motor, a filter motor MD, a panning motor MP, a tilting motor MT, a driver 210, a communication interface 212, a micro-computer 213, and an illuminator 215.

The OPS including a lens unit and a filter unit may optically process light emitted from a subject.

The lens unit of the OPS may include a zoom lens and a focus lens. The filter unit of the OPS may include an optical low pass filter (OLPF) used in a night operation mode and an infrared cut filter (IRF) used in a daytime operation mode. The OLPF may remove radio-frequency (RF) optical noise, and the IRF may cut off an IR component of incident light.

The OEC, which is a charge coupled device (CCD) type or a complementary metal-oxide-semiconductor (CMOS) type, may convert light emitted by the OPS into an electric analog signal. Here, the DSP 207 may control the timing circuit 202 and control operations of the OEC and the CDS-ADC 201.

The CDS-ADC 201 may process an analog image signal from the optoelectric converter OEC to remove radio-frequency (RF) noise from the analog image signal and adjust the amplitude of the analog image signal and convert the processed analog image signal into a digital image signal. The digital image signal may be transmitted to the digital signal processor 207.

The digital signal processor 207 serving as a main controller may process the digital image signal transmitted from the CDS-ADC 201 and generate digital image data classified into a luminance signal and a chromaticity signal.

The video-signal generator 208 may convert digital image data generated by the digital signal processor 207 into a video signal SVID, which is an analog image signal.

The digital signal processor 207 serving as a main controller may communicate with host devices, for example, computers, via a communication interface 212 and a communication channel DCOM and transmit the video signal SVID from the video-signal generator 208 through a video signal channel to the host devices.

Meanwhile, the micro-computer 213 may control the driver 210 and drive the iris motor MA, the zoom motor MZ, the focus motor MF, the filter motor MD, the panning motor MP, and the tilting motor MT. Also, the micro-computer 213 may control the illuminator 215 and irradiate illumination light to a transparent cover (not shown).

The iris motor MA may drive an iris diaphragm, the zoom motor MZ may drive a zoom lens, and the focus motor MF may drive a focus lens. The filter motor MD may drive the OLPF and the IRF.

The panning motor MP may rotate the OPS rightward and leftward. The tilting motor MT may rotate the OPS upward and downward.

Hereinafter, a shape detection method performed by a digital signal processor 207 serving as a main controller will be described with reference to FIGS. 3 through 10.

Figure 3:
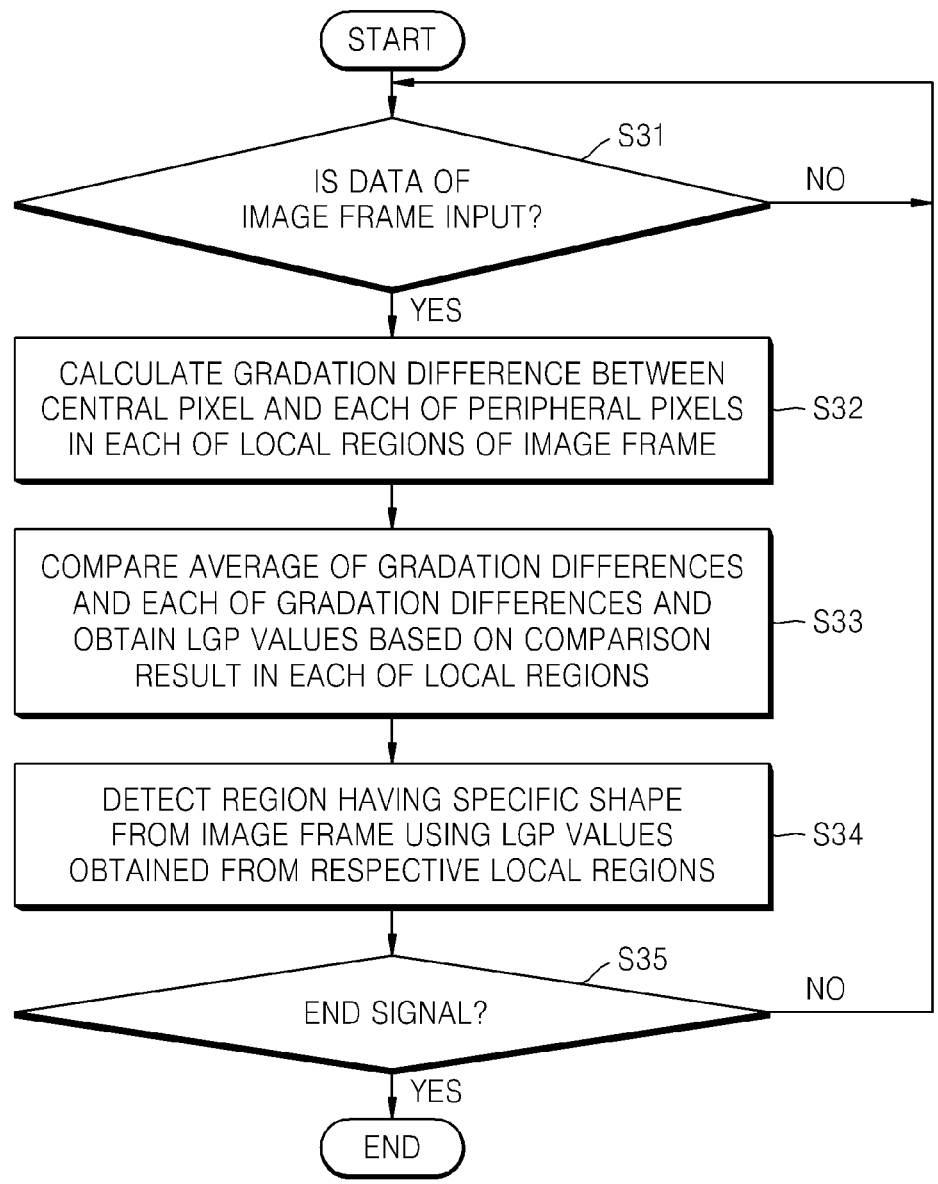
FIG. 3 is a flowchart illustrating a shape detection method performed using a digital signal processor serving as a main controller of FIG. 2.
Figure 4:
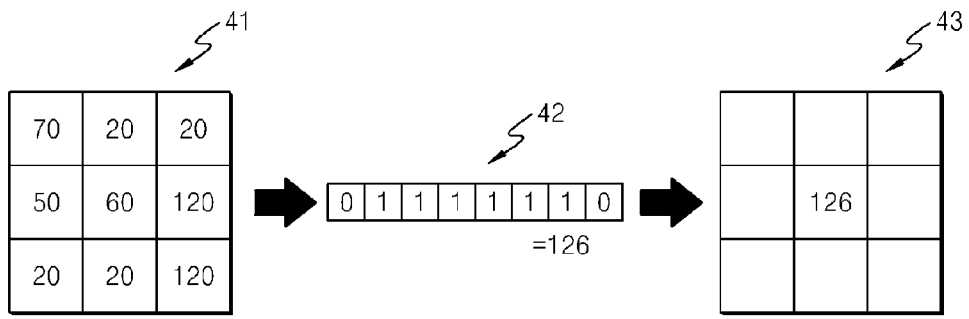
FIG. 4 is a diagram for explaining operations S32 and S33 of FIG. 3.

FIG. 3 is a flowchart illustrating a method of detecting a region having a specific shape performed by the digital signal processor 207 serving as the main controller of FIG. 2. FIG. 4 is a diagram for explaining operations S32 and S33 of FIG. 3. In FIG. 4, reference numeral 41 denotes a local region, 42 denotes a binary value of an LGP, and 43 denotes a denary value of the LGP. The method of FIG. 3 will now be described with reference to FIGS. 2 through 4.

When data of an image frame is input (operation S31), the digital signal processor 207 may calculate gradation differences between a gradation 60 of a central pixel and gradations of respective peripheral pixels in each of local regions 41 of an image frame (operation S32).

In addition, the DSP 207 may compare the average gradation difference with each of the gradation differences and obtain values 42 and 43 of the LGP based on a comparison result (operation S33).

Also, the DSP 207 may detect a region having a specific shape, for example, a region of the human's face or a region of a license number of a vehicle, from an image frame using values 43 of the LGP obtained from the respective local regions 41.

Operations S31 through S35 may be repetitively performed.

That is, the region having the specific shape may be detected from the image frame using the values of the LGP.

Accordingly, a camera may perform well under a variation of illumination using a texture pattern instead of directly using a gradation pattern.

In addition, each of the LGP values may include gradient information regarding gradation differences in each of the local regions. That is, each of the LGP values may include information regarding each of the gradation differences to the average gradation difference.

Accordingly, even if the gradation difference between the adjacent pixels becomes exceptionally great in the interfacial region having the specific shape, since the LGP values are not increased, difficulty of detecting the region having the specific shape under the circumstances of limited learning result data may be solved.

For example, when a human serving as a subject for photography wears very dark glasses at a high luminous intensity or when the human wears very bright makeup at a low luminous intensity, difficulty of detecting a face region may be solved.

Similarly, when a license plate of a vehicle is against a very dark background in a very bright light or is against a very bright background in a very dark light, difficulty of detecting a region of the license plate of the vehicle may be solved.

In connection with operations S32 and S33, a detailed process of obtaining a value of the LGP from any one local region will now be described below.

Each of the local regions 41 may include nine pixels and have four sides in form of a square, each side having three pixels. That is, the nine pixels may be arranged in form of a 3×3 matrix.

Operation S32 will now be described in detail with reference to FIG. 4.

First, a first gradation difference 10 between the gradation 60 of a central pixel and a gradation 70 of a left-upper pixel may be calculated.

Second, a second gradation difference 40 between the gradation 60 of the central pixel and a gradation 20 of a middle-upper pixel may be calculated.

Third, a third gradation difference 40 between the gradation 60 of the central pixel and the gradation 20 of a right-upper pixel may be calculated.

Fourth, a fourth gradation difference 60 between the gradation 60 of the central pixel and a gradation 120 of a right-middle pixel may be calculated.

Fifth, a fifth gradation difference 60 between the gradation 60 of the central pixel and the gradation 120 of a right-lower pixel may be calculated.

Sixth, a sixth gradation difference 40 between the gradation 60 of the central pixel and the gradation 20 of a middle-lower pixel may be calculated.

Seventh, a seventh gradation difference 40 between the gradation 60 of the central pixel and the gradation 20 of a left-lower pixel may be calculated.

Eighth, an eighth gradation difference 10 between the gradation 60 of the central pixel and a gradation 50 of a left-middle pixel may be calculated.

In operation S33, to begin with, an average (37.5) of the first through eighth gradation differences may be calculated. Accordingly, the average may be obtained as expressed in Equation 2:

$$\Delta m = \frac{\overset{7}{\underset{n=0}{Q}} |i_n - i_c|}{8}, \quad (2)$$

wherein $\Delta m$ denotes the average of the gradation differences, $i_c$ denotes the gradation 60 of the central pixel, and $i_n$ denotes each of gradations of pixels disposed adjacent to the central pixel.

Next, each of the gradation differences may be compared with the average ($\Delta m=37.5$) of the gradation differences, and an 8-bit value 126 of the LGP may be obtained based on a comparison result.

Here, binary data may be set as "0" when each of the first through eighth gradation differences is less than the average ($\Delta m=37.5$), and be set as "1" when each of the first through eighth gradation differences is not less than the average. Thus, the 8-bit value 126 of the LGP may be obtained. 8 bits may be arranged such that binary data obtained based on the result of comparison between the first gradation difference 10 and the average ($\Delta m=37.5$) is a least significant bit (LSB), and binary data obtained based on the result of comparison between the eighth gradation difference 10 and the average ($\Delta m=37.5$) is a most significant bit (MSB).

More specifically, since the first gradation difference 10 is less than the average ($\Delta m=37.5$), binary data of a first bit (bit number 0, the LSB) may e "0".

Since the second gradation difference 40 is greater than the average ($\Delta m=37.5$), binary data of a second bit (bit number 1) may be "1". Since the third gradation difference 40 is greater than the average ($\Delta m=37.5$), binary data of a third bit (bit number 2) may be "1".

Since the fourth gradation difference 60 is greater than the average ($\Delta m=37.5$), binary data of a fourth bit (bit number 3) may be "1". Since the fifth gradation difference 60 is greater than the average ($\Delta m=37.5$), binary data of a fifth bit (bit number 4) may be "1".

Since the sixth gradation difference 40 is greater than the average ($\Delta m=37.5$), binary data of a sixth bit (bit number 5) may be "1". Since the seventh gradation difference 40 is greater than the average ($\Delta m=37.5$), a seventh bit (bit number 6) may be "1".

Also, since the eighth gradation difference 10 is less than the average ($\Delta m=37.5$), binary data of an eighth bit (bit number 7) may be "0".

The method of forming the LGP may be expressed as in Equation 3:

$$LGP(x_c, y_c) = \overset{7}{\underset{n=0}{Q}} s(|i_n - i_c| - \Delta m) 2^n, \quad (3)$$

wherein $x_c$, $y_c$ denotes central coordinates of each of the local regions 41, $i_c$ denotes the gradation of the central pixel, and $i_n$ denotes each of gradations of pixels disposed adjacent to the central pixel. Function of $s(|i_n - i_c| - \Delta m)$ is "1" when $|i_n - i_c| - \Delta m$ is 0 or more, and is "0" when $|i_n - i_c| - \Delta m$ is less than "0".

Figure 1:
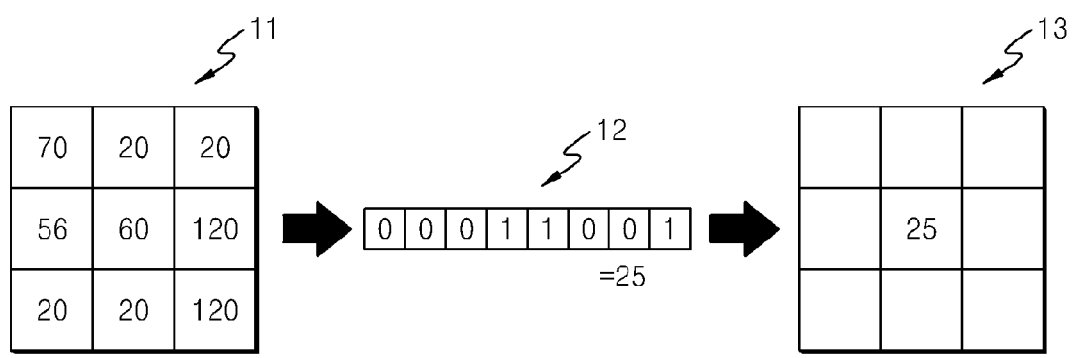
FIG. 1 is a diagram illustrating a method of forming a local binary pattern (LBP) used for detecting a region having a specific shape in a typical camera.
Figure 5:
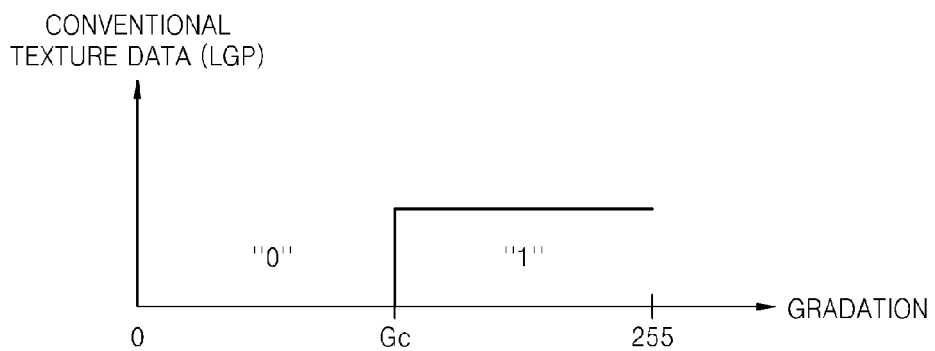
FIG. 5 is a graph showing characteristics of a conventional local binary pattern (LBP) of FIG. 1.
Figure 6:
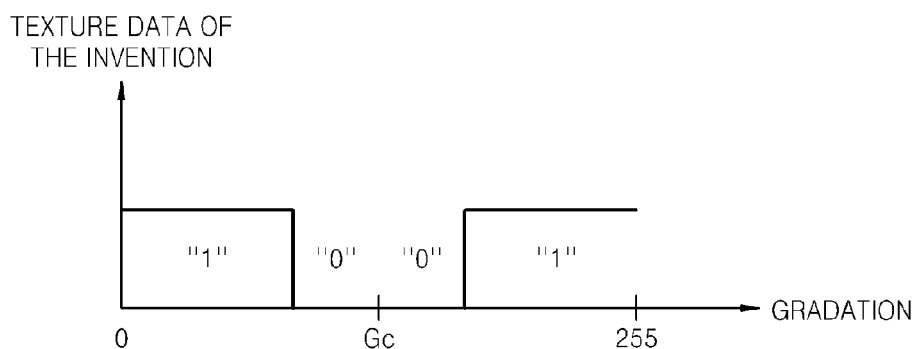
FIG. 6 is a graph showing characteristics of a pattern of FIG. 4, which is named a local gradient pattern (LGP), according to an exemplary embodiment.

FIG. 5 is a graph showing characteristics of a conventional LBP of FIG. 1, and FIG. 6 is a graph showing characteristics of a pattern of FIG. 4, which is named a LGP, according to an exemplary embodiment.

Referring to FIG. 5, texture data of the conventional LBP may be "0" when the gradation of each of adjacent pixels is less than that of a central pixel, and be "1" when the gradation of each of the adjacent pixels is not less than that of the central pixel. When a gradation difference between the adjacent pixels in an interfacial region having a specific shape is exceptionally great, the LBP values may be also exceptionally increased. Accordingly, a region having a specific shape cannot be detected under the circumstances of limited learning result data.

However, referring to FIG. 6, texture data of the LGP according to an embodiment may be "0" or "1" when the gradation of each of the adjacent pixels is less than that of the central pixel, and be "0" or "1" when the gradation of each of the adjacent pixels is not less than that of the central pixel. That is, the LGP according to an embodiment may not be directly related to a gradation difference between the adjacent pixels. When the gradation difference between the adjacent pixels is exceptionally great in the interfacial region having the specific shape, the LBP values may not be also exceptionally increased. Accordingly, difficulty in detecting the region having the specific shape under circumstances of limited learning result data may be solved.

Figure 7:
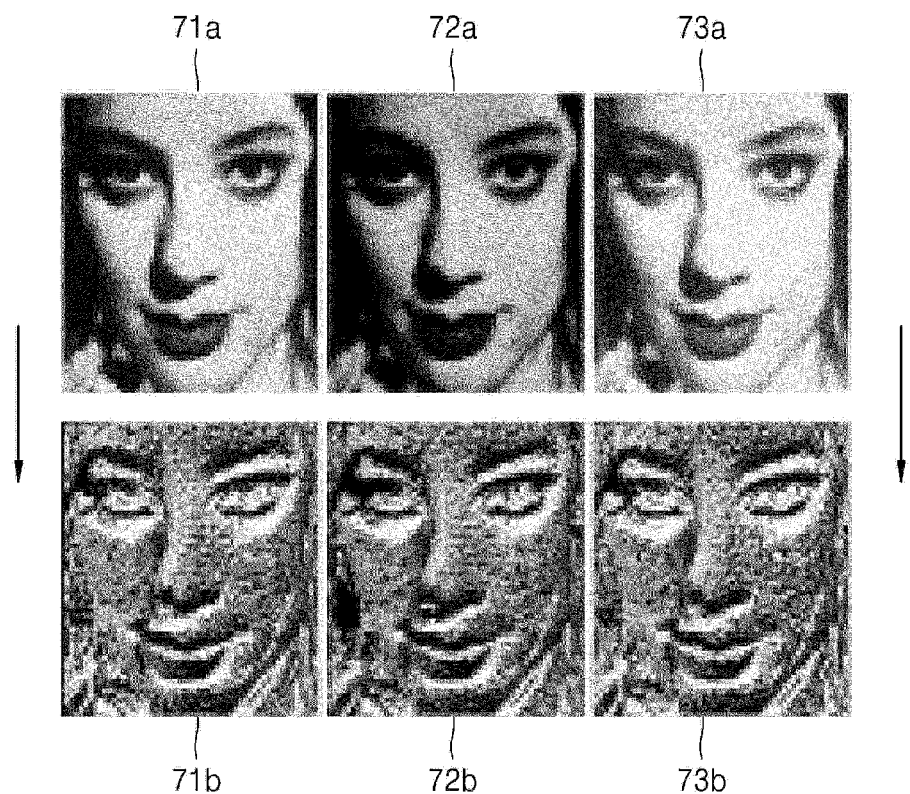
FIG. 7 shows images of an LGP of FIG. 4, which correspond to images of an original gradation pattern captured in different illumination circumstances.

FIG. 7 shows images of an LGP of FIG. 4, which correspond to images of an original gradation pattern captured in different illumination circumstances.

In FIG. 7, reference numerals 71a to 73a denote the images of the original gradation pattern captured in different illumination circumstances. Reference numeral 71b to 73b denote the images of the LGP of FIG. 4 corresponding to the images of the original gradation pattern. The images 71b to 73b of the LGP may exhibit good texture and be similar to one another.

That is, when a face region is detected using the images of the LGP of FIG. 4, since a texture pattern is used instead of directly using a gradation pattern, a camera may perform well in environments of various degrees of illumination.

Figure 8:
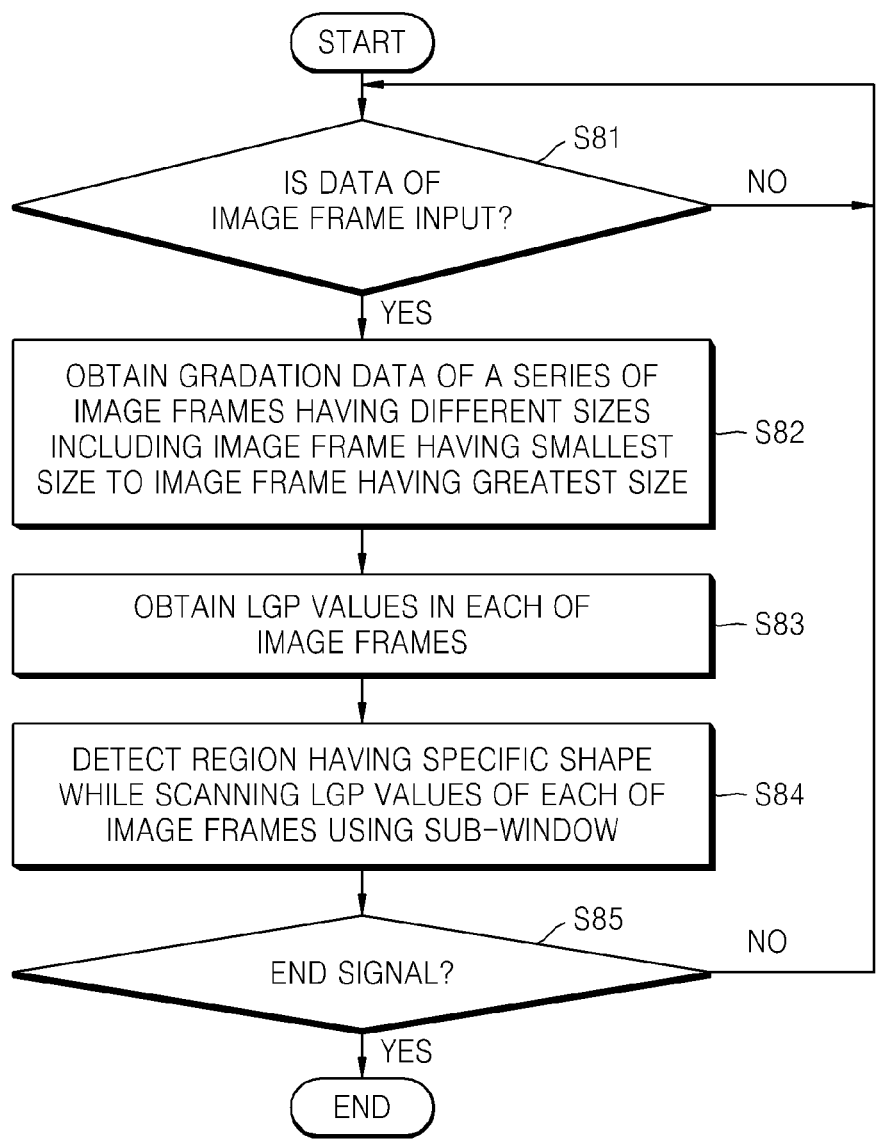
FIG. 8 is a flowchart illustrating the entire shape detection method to which the shape detection method of FIG. 3 is applied.
Figure 10:
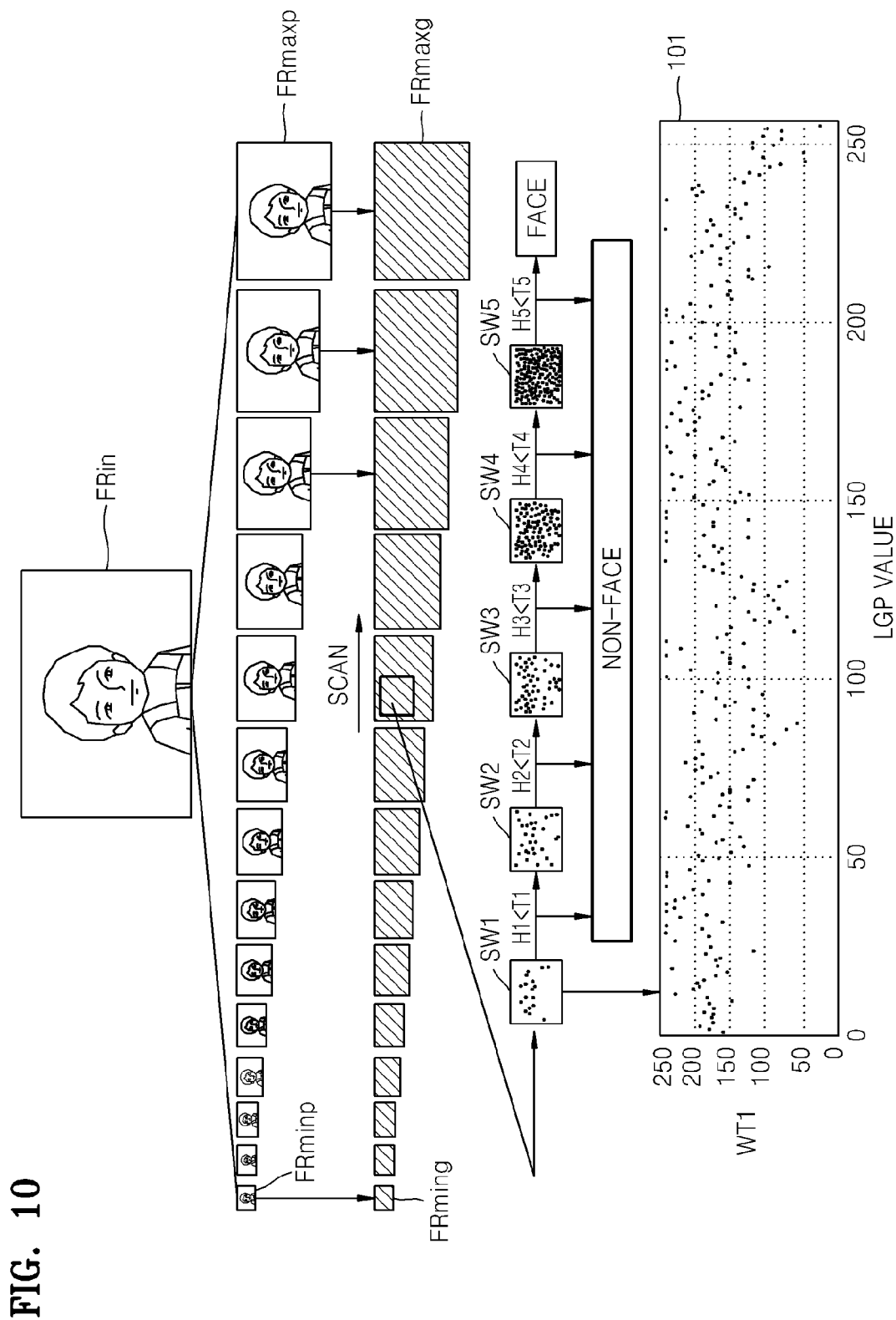
FIG. 10 is a diagram for explaining an example of a shape detection method of FIG. 8.

FIG. 8 is a flowchart illustrating the entire shape detection method to which the shape detection method of FIG. 3 is applied. FIG. 10 is a diagram for explaining an example of a shape detection method of FIG. 8.

The entire shape detection method to which the shape detection method of FIG. 3 will be described with reference to FIGS. 2, 8, and 10.

When data of an image frame is input (FRin) (operation S81), a DSP 207 serving as a main controller may obtain respective gradation data of a series of image frames having different sizes, which may range from an image frame having the smallest size (FRminp) to an image frame having the greatest size (FRmaxp) (operation S82).

In addition, the DSP 207 may perform operations S32 and S33 of FIG. 3 on each of the image frames having different sizes and obtain LGP values FRming to FRmaxg of the respective image frames (operation S83).

Also, the DSP 207 may scan the LGP values FRming to FRmaxg of the respective image frames using a sub-window and detect a region having a specific shape (e.g., a face region) in operation S34 of FIG. 3 (operation S84).

Operations S81 to S84 may be repetitively performed until an end signal is generated (operation S85).

In operation S84, to determine whether any one region to which the sub-window is applied is the region having the specific shape (e.g., the face region), when the sub-window is a non-shape region (e.g., a non-face region), non-shape weights of the LGP values, for example, learning result data (101, etc.) of the non-face weights (WT1 etc.), may be applied to specific positions of the sub-window.

Here, the learning result data may be a plurality of learning result data (101, etc.) obtained when reference data of non-shape weights (e.g., non-face weights (WT1, etc.)) have different precisions. Also, learning result data having a lowest precision through learning result data having a highest precision may be applied in a sequential order to any one region to which the sub-window is applied.

Figure 9:
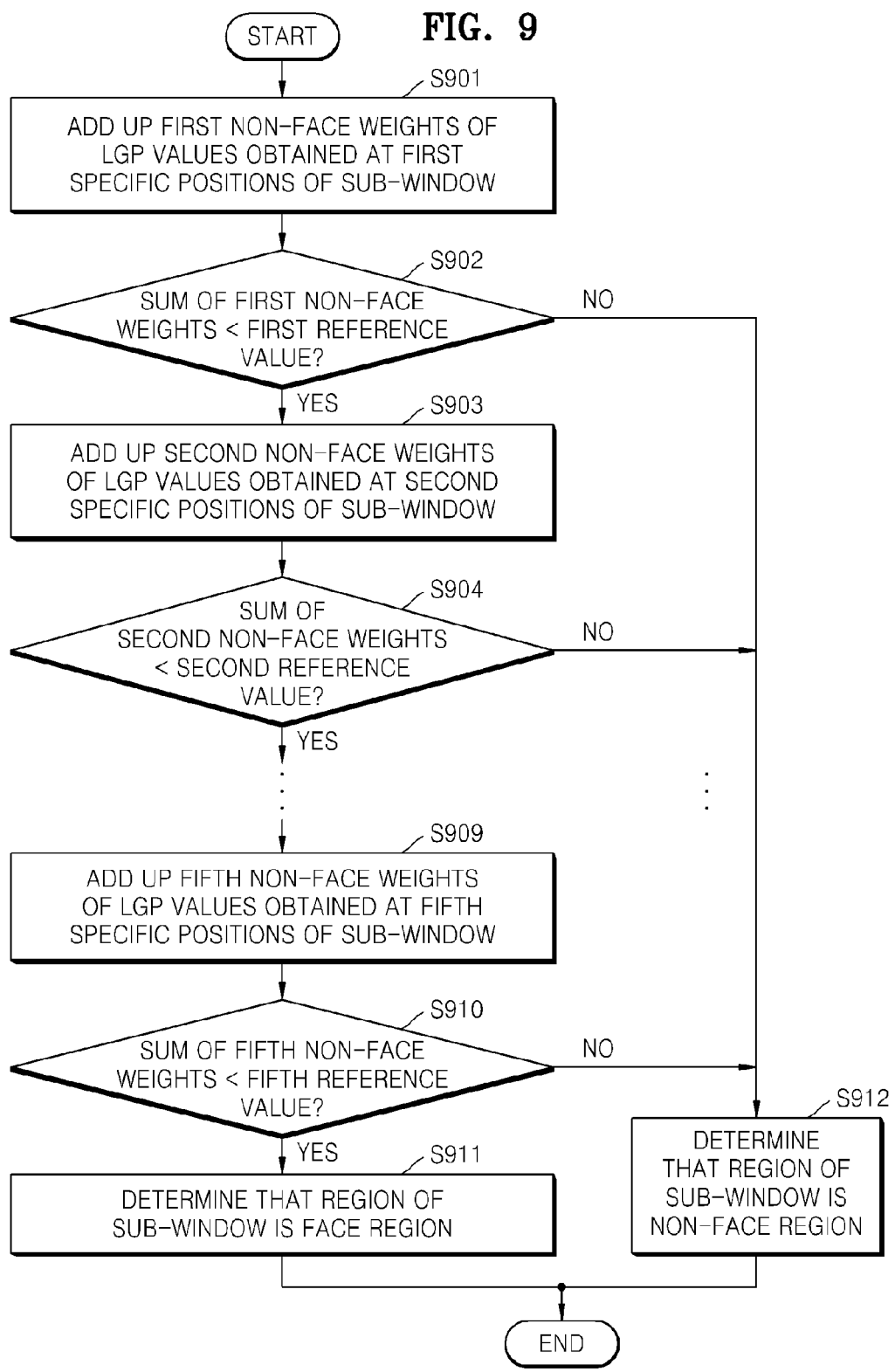
FIG. 9 is a flowchart illustrating an example of a method of determining whether or not a region to which a sub-window is applied is a region having a specific shape in operation S84 of FIG. 8.

FIG. 9 is a flowchart illustrating an example of a method of determining whether or not a region to which a sub-window is applied is a region having a specific shape in operation S84 of FIG. 8. Naturally, the determination method of FIG. 9 may be applied likewise to a region of a license plate of a vehicle. A method of determining whether any one region to which a sub-window is applied is a region having a specific shape, for example, a face region, in operation S84 of FIG. 8 will now be described with reference to FIGS. 2, 9, and 10.

Initially, the DSP 207 serving as a main controller may add up first non-face weights WT1 of LGP values obtained at first specific positions SW1 of the sub-window (operation S901).

Next, when a sum H1 of the first non-face weights WT1 is not less than a first reference value T1 (operation S902), the DSP 207 may determine that a current region of the sub-window is a non-face region (operation S912) and end the process. Here, the end of the process may refer to transferring the sub-window to the next region.

When the sum H1 is less than the first reference value T1 in operation S902, the DSP 207 may add up second non-face weights of the respective LGP values obtained at second specific positions SW2 of the sub-window (operation S903).

Next, when a sum H2 of the second non-face weights is not less than a second reference value T2 (operation S904), the DSP 207 may determine that a current region of the sub-window is a non-face region (operation S912) and end the process.

The above-described process may be applied likewise to a sum H3 of third non-face weights and a third reference value T3 corresponding to third specific positions SW3 of the sub-window and a sum H4 of fourth non-face weights and a fourth reference value T4 corresponding to fourth specific positions SW4 of the sub-window.

When the sum H4 of the fourth non-face weights obtained at the fourth specific positions SW4 of the sub-window is less than the fourth reference value T4, the DSP 207 may add up fifth non-face weights of LGP values obtained at fifth specific positions SW5 of the sub-window (operation S909).

When a sum H5 of the fifth non-face weights is not less than a fifth reference value T5 (operation S910), the DSP 207 may determine that a current region of the sub-window is a non-face region (operation S912) and end the process.

When the sum H5 is less than the fifth reference value T5 (operation S910), the DSP 207 may determine that the current region of the sub-window is the face region (operation S911).

The method of FIG. 9 may be summarized and supplemented as follows.

In a case where learning result data of any one of the specific positions SW1 to SW5 of the sub-window is applied, when it is determined that any one region to which the sub-window is applied is a non-shape region, for example, a non-face region, the non-shape region (e.g., the non-face region) may be finally determined without applying the next learning result data. Also, when it is determined that any one region to which the sub-window is applied is a region having a specific shape, for example, a face region, the next learning result data may be applied.

Here, in a case where learning result data having a highest degree of precision is finally applied, when it is determined that any one region to which the sub-window is applied is a region having a specific shape, for example, a face region, the region having the specific shape may be finally determined (refer to operations 910 to S911 of FIG. 9).

According to the determination method of FIG. 9, the non-shape region (e.g., the non-face region) may be determined more rapidly so that the sub-window can move fast to the next region. In other words, a shape detection speed may increase.

Naturally, the method of FIGS. 9 and 10 according to an embodiment may be applied likewise to a region of a license plate of a vehicle.

According to the shape detection method as explained thus far, a region having a specific shape can be detected from an image frame using LGP value newly named. Thus, a camera can be robust against a variation of illumination using a texture pattern instead of directly using a gradation pattern.

In addition, each of the LGP values may include gradient information regarding gradation differences in a local region. That is, each of the LGP values may include information regarding each of the gradation differences to the average gradation difference.

Thus, even if a gradation difference between adjacent pixels becomes exceptionally great in an interfacial region having a specific shape, LGP values are not increased so that the region having the specific shape cannot be detected under circumstances of limited learning result data.

For example, when a human serving as a subject for photography wears very dark glasses at a high luminous intensity or when the human wears very bright makeup at a low luminous intensity, difficulty of detecting a face region may be solved.

Similarly, when a license plate of a vehicle is against a very dark background in a very bright daytime or is against a very bright background in a very dark nighttime, difficulty of detecting a region of the license plate of the vehicle may be solved.

has Although a few exemplary embodiments have been shown and described, it will be understood by those of ordinary skill in the art that various changes in form and details may be made to the exemplary embodiments without departing from the spirit and scope of the inventive concept as defined by the following claims.

What is claimed is:

1. A method of detecting a region having a specific shape by processing input image data, the method comprising:
    calculating gradation differences between a central pixel and respective peripheral pixels in each of local regions of an image frame;
    comparing an average gradation difference with each of the calculated gradation differences and obtaining local gradient pattern (LGP) values based on a comparison result in each of the local regions of the image frame; and
    detecting the region having the specific shape from the image frame using the LGP values obtained from the respective local regions.

2. The method of claim 1, wherein respective gradation data of a series of image frames having different sizes ranging from an image frame having a smallest size to an image frame having a greatest size are obtained,
    the calculating gradation differences and the comparing an average gradation difference are performed on each of the image frames having different sizes to obtain LGP values of the respective image frames,
    and the LGP values of the respective image frames are scanned using a sub-window in the detecting the region having the specific shape.

3. The method of claim 2, wherein to determine whether or not any one region to which the sub-window is applied is the region having the specific shape in the detecting the region having the specific shape, when the sub-window is a non-shape region, learning result data of non-face weights of the LGP values are applied to specific positions of the sub-window.

4. The method of claim 3, wherein the learning result data are a plurality of learning result data obtained when reference data of non-shape weights have different precisions, and learning result data having a lowest precision through learning result data having a highest precision are applied in a sequential order to any one region to which the sub-window is applied.

5. The method of claim 4, wherein when any one of the learning result data is applied and it is determined that the any one region to which the sub-window is applied is the non-shape region, the non-face region is finally determined without applying the next learning result data,
    and when it is determined that the any one region to which the sub-window is applied is the region having the specific shape, the next learning result data is applied.

6. The method of claim 5, wherein when the learning result data having the highest precision is finally applied and it is determined that the any one region to which the sub-window is applied is the region having the specific shape, the region having the specific shape is finally determined.

7. A camera performing the method of claim 1.

8. A method of detecting a region having a specific shape, the method comprising:
    inputting image frame data;
    obtaining gradation data of a series of image frames having different sizes;
    obtaining local gradient pattern (LGP) values of each of the image frames having different sizes; and
    detecting the region having the specific shape while scanning LGP values of each of the image frames using a sub-window.

9. The method of claim 8, wherein, in the detecting the region having the specific shape, to determine whether any one region to which the sub-window is applied is the region having the specific shape, when the sub-window is a non-shape region, non-shape weights of the LGP values, are applied to specific positions of the sub-window.

10. The method of claim 8, wherein the LGP values of each of the image frames having different sizes is obtained by calculating gradation differences between a central pixel and respective peripheral pixels in each of local regions of an image frame and comparing an average gradation difference with each of the calculated gradation differences and obtaining the LGP values based on a comparison result in each of the local regions.

11. A camera performing the method of claim 8.

* * * * *